(12) United States Patent
Kumar et al.

(10) Patent No.: US 12,468,875 B1
(45) Date of Patent: Nov. 11, 2025

(54) METHOD AND SYSTEM TO IMPLEMENT ALTITUDE BASED I/O RE-LAYERING FOR ELECTRONIC AND PHOTONIC DESIGNS

(71) Applicant: Cadence Design Systems, Inc., San Jose, CA (US)

(72) Inventors: Amit Kumar, Greater Noida (IN); Hitesh Marwah, Noida (IN); Arnold Ginetti, Antibes (FR)

(73) Assignee: Cadence Design Systems, Inc., San Jose, CA (US)

( * ) Notice: Subject to any disclaimer, the term of this patent is extended or adjusted under 35 U.S.C. 154(b) by 720 days.

(21) Appl. No.: 17/738,992

(22) Filed: May 6, 2022

(51) Int. Cl.
*G06F 30/30* (2020.01)
*G06F 30/373* (2020.01)
*G06F 30/394* (2020.01)
*G06F 30/398* (2020.01)
*G06F 113/18* (2020.01)

(52) U.S. Cl.
CPC .......... *G06F 30/394* (2020.01); *G06F 30/373* (2020.01); *G06F 30/398* (2020.01); *G06F 2113/18* (2020.01)

(58) Field of Classification Search
None
See application file for complete search history.

(56) References Cited

U.S. PATENT DOCUMENTS

| | | | | |
|---|---|---|---|---|
| 5,579,249 A * | 11/1996 | Edwards | ................. | G06F 30/23 703/2 |
| 6,802,048 B2 * | 10/2004 | Goto | ...................... | H01L 24/49 716/112 |
| 7,869,221 B2 * | 1/2011 | Knight | .................... | H01L 23/48 361/766 |
| 9,032,342 B2 * | 5/2015 | Wahlsten | .............. | G03F 9/7003 430/30 |
| 9,646,128 B2 * | 5/2017 | Mehta | .................... | G06F 30/392 |
| 2018/0137005 A1 * | 5/2018 | Wu | .......................... | G11C 7/10 |
| 2021/0057365 A1 * | 2/2021 | Kuo | ........................ | H01L 24/11 |

* cited by examiner

*Primary Examiner* — Leigh M Garbowski
(74) *Attorney, Agent, or Firm* — Vista IP Law Group, LLP

(57) ABSTRACT

Disclosed is an improved approach to implement electronic designs by performing altitude-based re-layering for I/Os. The altitude-based die stack layers allows N number of die stack layers corresponding to the actual altitudes of the I/Os in the design.

20 Claims, 22 Drawing Sheets

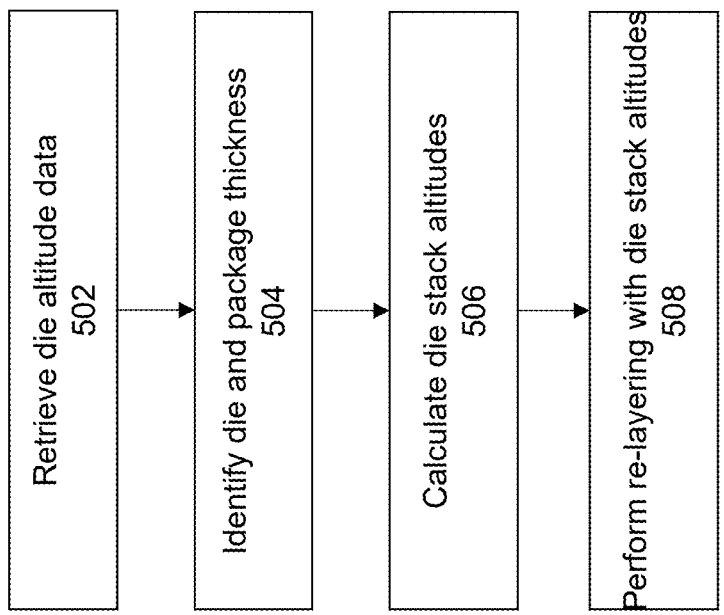

METHOD AND SYSTEM TO IMPLEMENT ALTITUDE BASED I/O RE-LAYERING FOR ELECTRONIC AND PHOTONIC DESIGNS

FIELD

The invention relates to the implementation of electronic designs, such as the design of Integrated Circuits (ICs), Photonic ICs, and packages for ICs.

BACKGROUND

A semiconductor integrated circuit has a large number of electronic components, such as transistors, logic gates, diodes, or wires. These electronic components are arranged in an ordered design to implement desired electrical functionality in the IC. In its physical form, the IC is fabricated by forming layers of different materials of different geometric shapes and different sizes on various regions of a silicon wafer, where the exact configuration of those geometric shapes are used to create and implement the electronic and circuit IC components.

In its productized form, the IC is normally contained within an IC package, which includes materials that encapsulate the IC. The package uses its materials to surround the IC such that the IC is protected from corrosion and physical damage. The package will also include a set of connection points to allow electrical connections to the IC, so that electrical signals can be connected from the IC through the package to any external connection points that are needed (e.g., to a printed circuit board).

It is therefore very important that the electrical connection points within the package are designed to exactly match the configuration of the I/O components on the IC. Failure to properly implement these connection points in the package could result in functional failures or errors during operation of the IC.

In the typical design process, the IC designer will pass a set of design files to the package designer so that the package designer can implement a package design that matches the I/O configuration of the one or more IC dies that are intended to be placed into the package design. "Die stacking" is the process of mounting multiple IC dies within a single semiconductor package. The basic assumption of the package designer is that each I/O interface layer between the package and a die, or between any two dies in the package, will typically correspond only to either the front face or back face of a die. This is because many ICs typically only have I/Os corresponding to its two planar layers/faces for the front side and back side of the die, and therefore it is conventionally assumed that a die stack interface layer or metal interface layer in the package is to be implemented at fixed locations relative to those front or back sides of the die.

The issue faced by the current disclosure is that problems may occur when making the assumption that the die stack interface layer or metal interface layer should always align with just these two locations, at the front or back side of the dies in the package. The problem is that certain types of electrical designs may include dies that have I/O connection points at locations other than the front side or back side of the die. As a result, a package design that fails to account for these non-front side or non-back side IC designs may result in misaligned connection points between the dies and the package, or between the dies themselves in the package, where detection problems occur when trying to properly identify real occurrences of these misalignments. These faulty assumptions may lead to a package design that is not properly implemented or verified during the design process, or lead to excessive delays in the design process to identify and fix faulty design implementations.

Similar issues may also exist with respect to package designs for photonic ICs. A photonic IC typically includes multiple types of I/Os, including both electrical I/Os and optical I/Os. The electrical I/Os may very well be placed on top and bottom layers for electrical conductivity, but in contrast the optical I/Os may be placed along and within lateral walls that couple to other photonic I/Os that themselves have laterally-configured optical I/Os. As such, significant problems may occur when making the assumption that an interface layer in a package design should always align with just the front or back side of the dies in the package, given that lateral I/O locations exist within layers of the photonic IC.

Therefore, there is a need for an improved approach to facilitate the design of electronic circuits, particularly with respect to implementation of interface layers in a package design for ICs and photonic ICs.

SUMMARY

Embodiments of the invention provide an improved approach to implement electronic designs by performing altitude-based re-layering for I/Os and photonic I/Os. The altitude-based approach resolves the problems associated with approaches that are limited to die stack layers at just the front and back sides of the dies. Unlike the approach that is limited to just two dies stack layers, the altitude-based die stack layers will allow N number of die stack layers corresponding to the actual altitudes of the I/Os in the design. This prevents the mistaken association of I/Os at different elevations to the same die stack layer.

Other and additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 5 shows a flowchart of an approach to perform altitude-based re-layering according to some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As previously discussed, the issue faced by the current disclosure is that problems may occur when making the assumption that the die stack interface layer or metal interface layer should always align with the front or back side of the dies in the package. Embodiments of the present invention solves this problem by performing altitude-based re-layering for I/Os in the electrical design.

Figure 1:
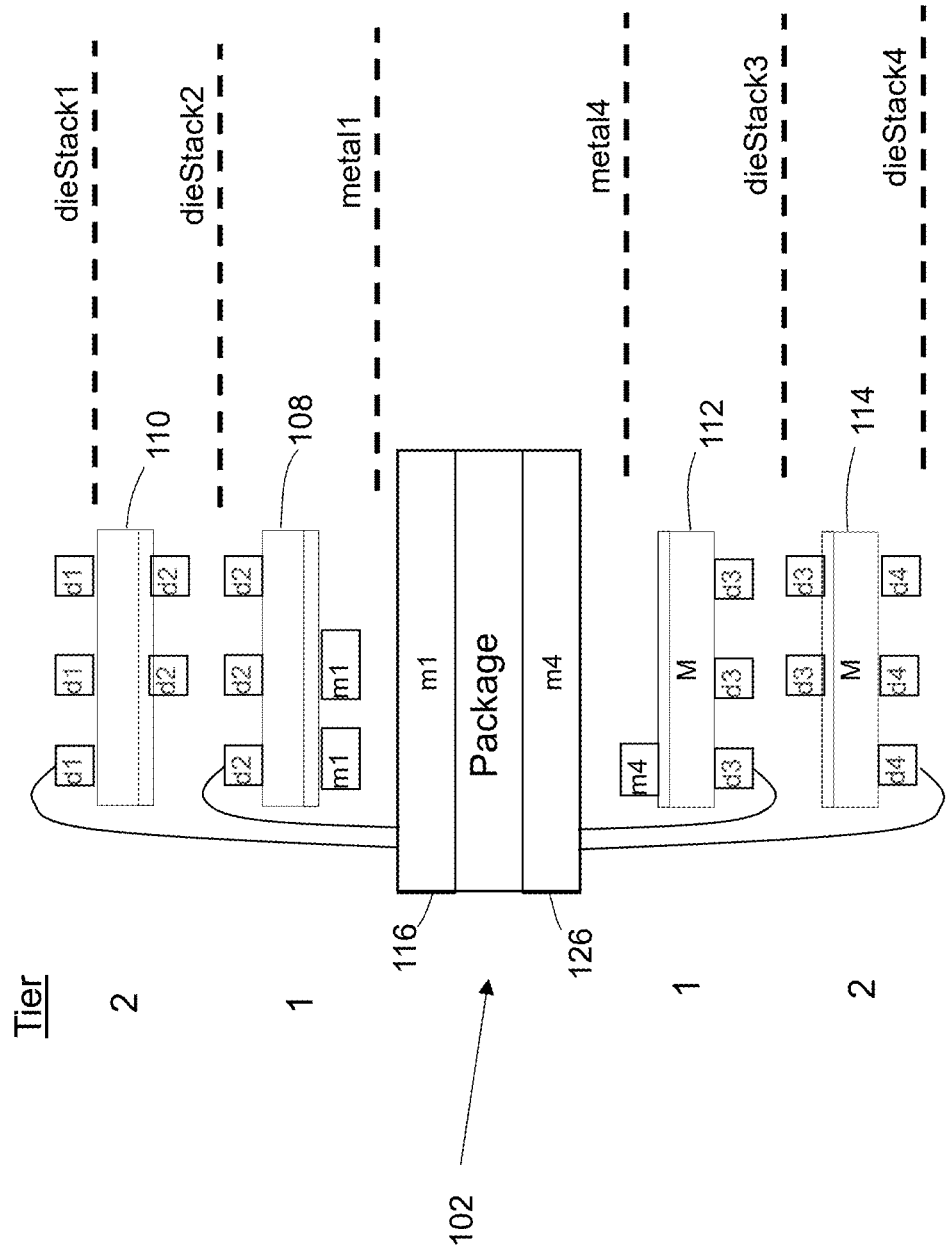
FIG. 1 provides an illustration of background information implementation of die stack and metal interface layers.

FIG. 1 provides an illustration of some background information that is helpful for explanation of the invention, where die stack and metal interface layers are aligned only with the front and back sides of the dies in a package.

This figure shows a semiconductor package 102 having a metal 1 layer (116) and a metal 4 layer (126). Two dies/ICs 108 and 110 are stacked at tiers 1 and 2, respectively, at the top of the package 102. Two dies/ICs 112 and 114 are stacked at tiers 1 and 2, respectively, at the bottom of the package 102.

The package design data is normally a separate set of design data from the IC design data. The IC design data is used in the package design process to implement the package design. During the design process, the die footprints of the ICs are instantiated in the package layout by the package designer. The die layout corresponds to the cellview (e.g., for the data used by the EDA software application) that represents the IC design including the layout, schematic, and symbol data for the IC. The exported die footprint is the cellview that represents the footprint of the die, which will be instantiated in the package design.

The separation between the two different sets of design data for the IC design and the package design means that certain levels of data conversions, translations, and/or interfacing may need to occur for the package designer to use the IC design data to implement the package design. For example, while the IC design data includes information about the multiple layers within the IC, that IC layer information (e.g., information for the I/O layers on the IC) is specifically implemented within the context of the IC design, and hence may need to be "re-layered" to make that information useful in the context of the package design.

Typically, the ICs have I/Os on two layers, the front side and back side, which are used to interact with the package, other ICs, or an interposer. Therefore, when the die is instantiated within the package cellview, these I/Os on the front side or back side layers are normally re-layered to package metal or die-stack layers based upon the die parameters. In the current example of FIG. 1, the front side of die 110 would be associated with die stack layer 1 (dieStack1). The layer between the back side of die 110 and the front side of die 108 would be associated with die stack layer 2 (dieStack2). The layer between the back side of die 108 and the metal 1 layer 116 of the package 102 would be associated with metal1 layer. On the other side of the package, the layer between the back side of die 112 and the metal 4 layer of the package 102 would be associated with metal4 layer, the layer between the front side of die 112 and the back side of die 114 would be associated with die stack layer 3 (dieStack3), and the front side of die 114 would be associated with die stack layer 4 (dieStack4).

This figure provides an example where the die-stack and metal interface layers within the package are implemented with the assumption that I/Os on the ICs are located on the front and back sides of the ICs. For this particular example, this approach is fine since the I/Os are indeed located only on those front and back sides of the dies.

However, other types of electrical designs may include dies that have I/O connection points at locations other than the front side or back side of the die. The problem is that a package design that fails to account for these non-front face or non-back face IC designs may lead to a situation where the package design is not properly implemented or verified during the design process, or which leads to excessive delays in the design process to identify and fix faulty design implementations.

For example, a "cavitated" die is an example of a type of die where the die may include an I/O that is not at the absolute front or back side of the die. A cavitated die is one where the die includes at least one cavity. The cavitated dice may interact with other dies and the package with I/Os at different facets, which are present at different height levels.

Figure 2A:
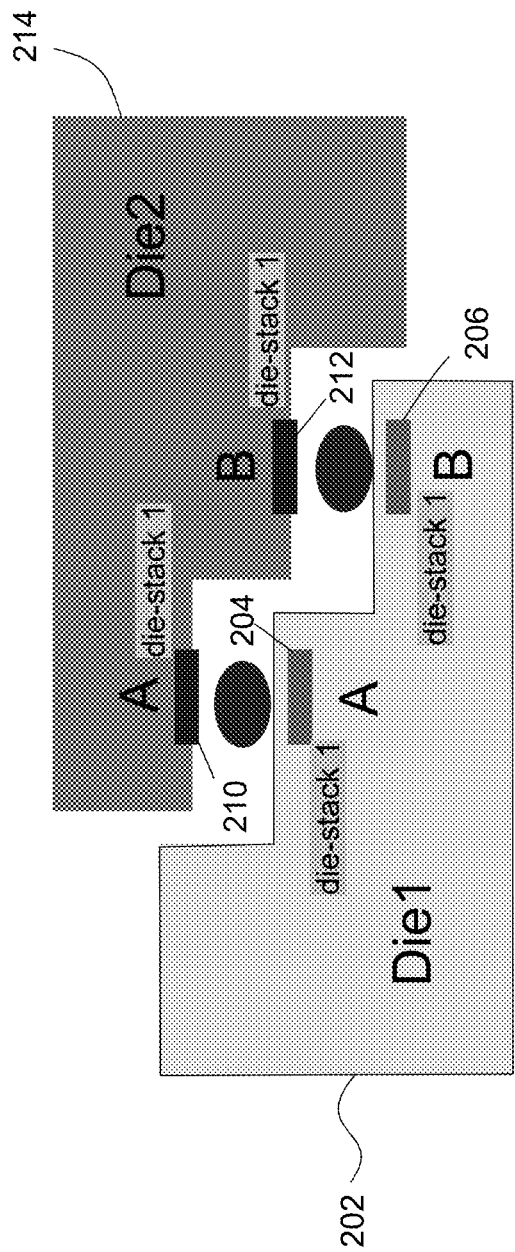
FIGS. 2A-C and 3A-C provide illustrative examples of die stack layers.

FIG. 2A provides an illustration of cavitated dies 202 and 204. This type of die may interact with another die or package at a location other than just the front or back side of the die. Here, die 202 includes a first I/O 204 and a second I/O 206 on facets at different heights within its cavities. These I/Os interact, respectively, with I/Os 210 and 212 at different facets on die 214. These dies present examples of cavitated dies having stair-case shaped cavities. It is noted that other types of cavity shapes may also exists, e.g., U-shaped cavities.

With conventional I/O re-layering approaches, on die instantiation, I/Os are re-layered from the top or bottom side of die to one specific package layer (e.g., depending on die's tier, mirror and flipped parameters). What this means is that even though the I/O on a facet of a cavity in a die is at a different height from the front or back side of the die, they will nonetheless be re-layered to the same die stack layer in the package. In the current example, I/Os 204 and 206 in die 202 within a cavity in the die 202 are both located facing the same top surface direction for the die 202. Therefore, with conventional systems, these would all be associated with the same die stack layer (dieStack1). Similarly, I/Os 210 and 212 in die 214 within a cavity in the die 214 are both located facing the same bottom surface direction for the die 214, which interfaces with the top side of die 202. Therefore, with conventional systems, these would all be associated with the same die stack layer (dieStack1).

One problem that may occur with this approach is that when a die editing or I/O editing operation is performed, this treatment of I/Os at different heights on the same die stack layer may create difficulties for the EDA system to identify and diagnose possible design problems for the design data.

Figure 2B:
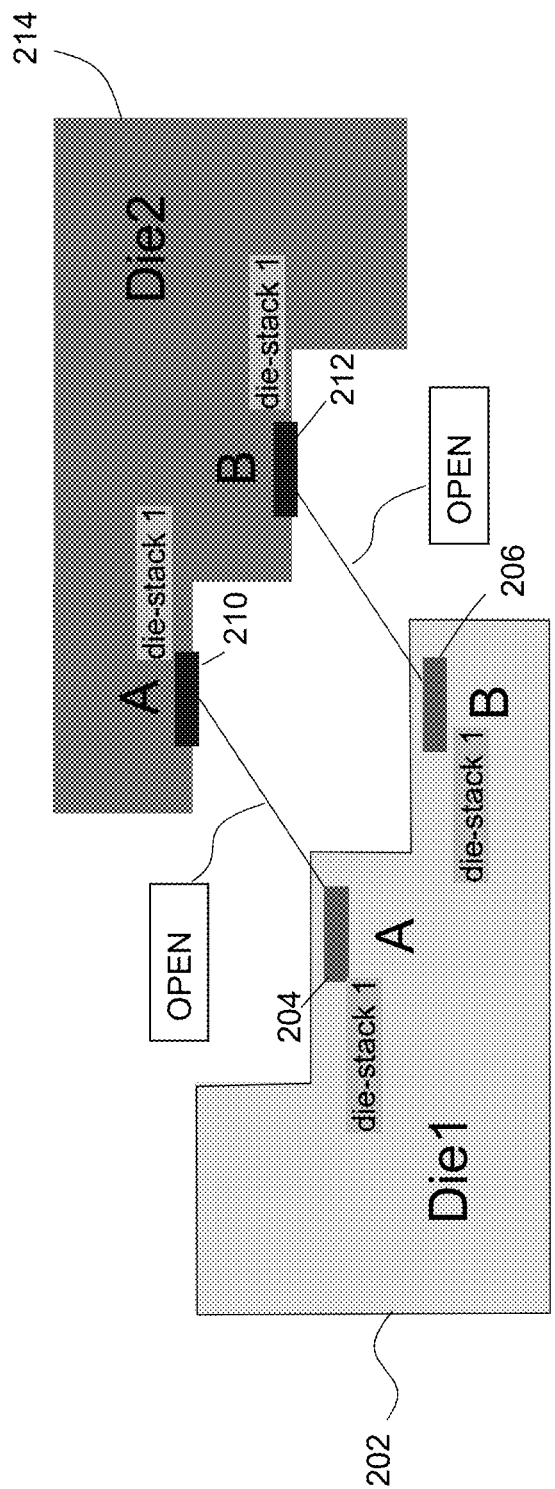

For example, consider the situation in FIG. 2B where an editing operation has occurred to shift the positioning of dies 202 and 204 relative to each other. Because of the editing operation, an "open" has occurred for the intended connection between I/O 204 on die 202 and I/O 210 on die 214, and a similar open has occurred for the intended connection between I/O 206 on die 202 and I/O 212 on die 214. This open, while problematic for the circuit/package design, is not problematic for the EDA tool since the EDA tool can simply look at the distance that was created between the I/Os to spot the open situations, and to therefore alert the designer of the problem that needs to be fixed.

Figure 2C:
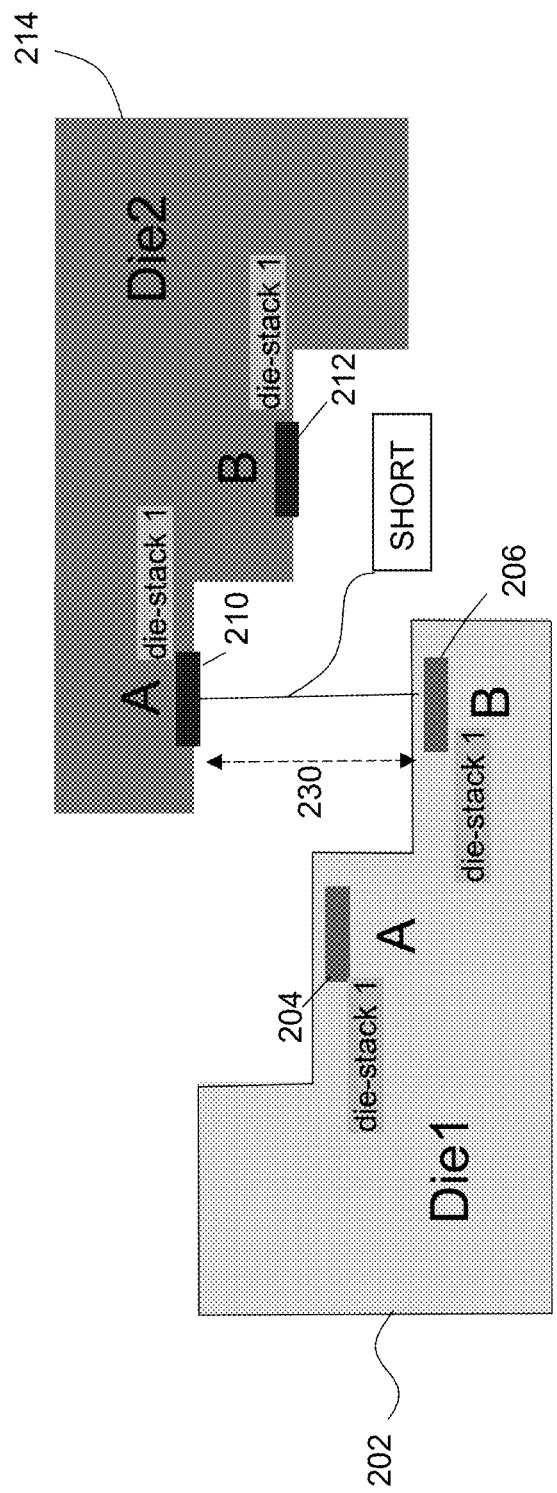

However, as shown in FIG. 2C, the real problem that has occurred pertains to the fact that the editing operation has caused I/O 210 on die 214 to now overlap in its geometric (X, Y coordinate) locations with respect to I/O 206 on die 202. Because the EDA tool/software system sees these I/Os are on the same die stack layer and overlap the same geometric coordinates in a planar 2D orientation, the EDA system will assume that an unintended short circuit has been created between I/O 206 and I/O 212. However, this is a "false positive" because, even though these two I/Os have been assigned to the same die stack layer (with the assumption that these I/Os on that same die stack layer have the same Z coordinate locations), they are actually located at different physical layers at different heights within the ICs themselves, and hence there is an actual physical distance 230 between these two I/Os (which means they are actually at different Z coordinate locations). As such, there is not really a short between these two I/Os. The issue is that if the EDA system calls out these types of false positive situations to the designer, then the design process may be saturated with false warnings that would waste the designer's time chasing down issues that do not really need to be fixed and potentially obscure actual problems that really should be highlighted for the designer to fix.

As another example, a photonic IC (PIC) is a type of IC that has I/Os on more than just the front and back layers. The PIC can be cavitated and can sit inside an interposer or another PICs, which make the complete optical system flexible to interact with a light source or sink from any direction (horizontal, vertical or lateral). The PIC can have electrical I/Os on multiple layers (e.g., a top metal layer and a bottom metal layer) for electrical connectivity. The PIC can have optical I/Os on "N" layers for optical coupling with I/Os of other ICs, an interposer, a package, and/or an optical source. For example, the PIC may implement optical I/Os as top side optical I/Os, bottom side optical I/Os, and/or lateral I/Os, with N layers of lateral I/Os possible for coupling with ICs sitting on the side orientation of a PIC. The optical I/Os at the top, bottom and side/lateral layers of PIC helps to create path for light from source to sink through all the PICs and interposer stack.

Figure 3A:
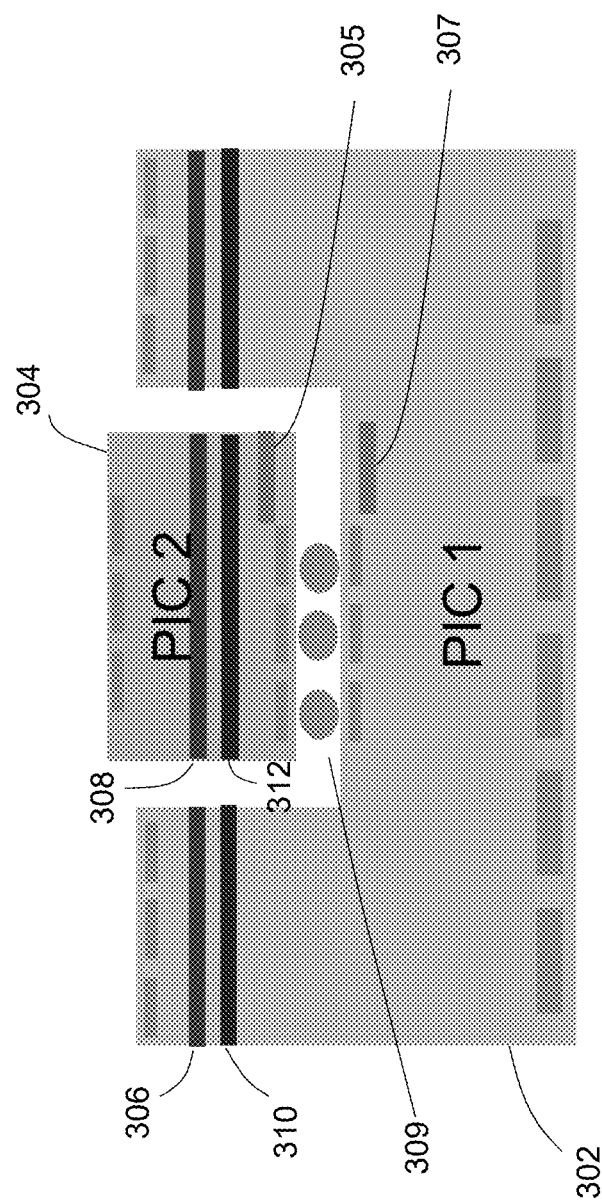

FIG. 3A shows an example of PIC 302 and PIC 304, where PIC 304 is stacked within a cavity of PIC 302. A PIC may include two types of I/Os, including electrical I/Os and optical I/Os. Each of the PICs in this example have photonic lateral I/Os through the sides of the PICs. For example, I/O 306 in PIC 302 is optically coupled to I/O 308 in PIC 304.

Similarly, I/O 310 in PIC 302 is optically coupled to I/O 312 in PIC 304. Photonic I/Os may also engage in vertical coupling between PICs. I/Os 305 and 307 provide examples of photonic I/Os on a front and back side of PICs that provide vertical optical coupling between PICs. These photonic I/Os may be implemented as waveguides as a material type for the optical interface, and a signal type "optical". The PICs may also include electrical I/Oss, such as electrical I/Os 309 on a front or back side of a PIC.

The issue that may occur is that during re-layering, since conventional technologies do not have an adequate mechanism to handle re-layering of such photonic I/Os, this means that the photonic I/Os may get mistakenly mapped to die stack layers in a problematic manner.

Figure 3B:
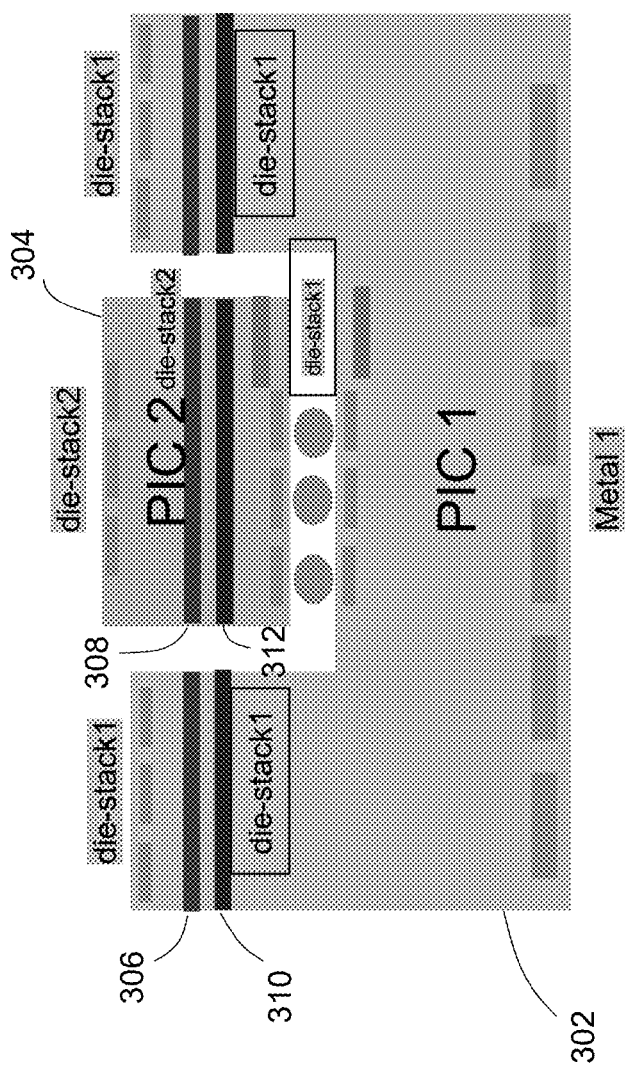

To explain, consider the results of re-layering as shown in FIG. 3B. Recall that conventionally, I/Os are assigned to die stack interface layers in a package based upon the assumption of a first layer being associated with the front side of the die and the assumption of a second layer being associated with the back side of the die. Here, the PICs have I/Os at the heights of the optical I/O layers—in addition to the heights of the front and sides of the PICs. Therefore, if the re-layering only created the two die-stack interface layers, then the optical I/Os will be mistakenly assigned to one of those die stack layers even if they are actually located at a different physical layer at a different height within the PIC.

In the current example of FIG. 3B, this means that photonic I/Os 306 and 310 may be mapped to the same die stack layer (die stack 1), even though they are actually located on different layers within PIC 302. Similarly, photonic I/Os 308 and 312 may be mapped to the same die stack layer (die stack 2), even though they are actually located on different layers within PIC 304.

Figure 3C:
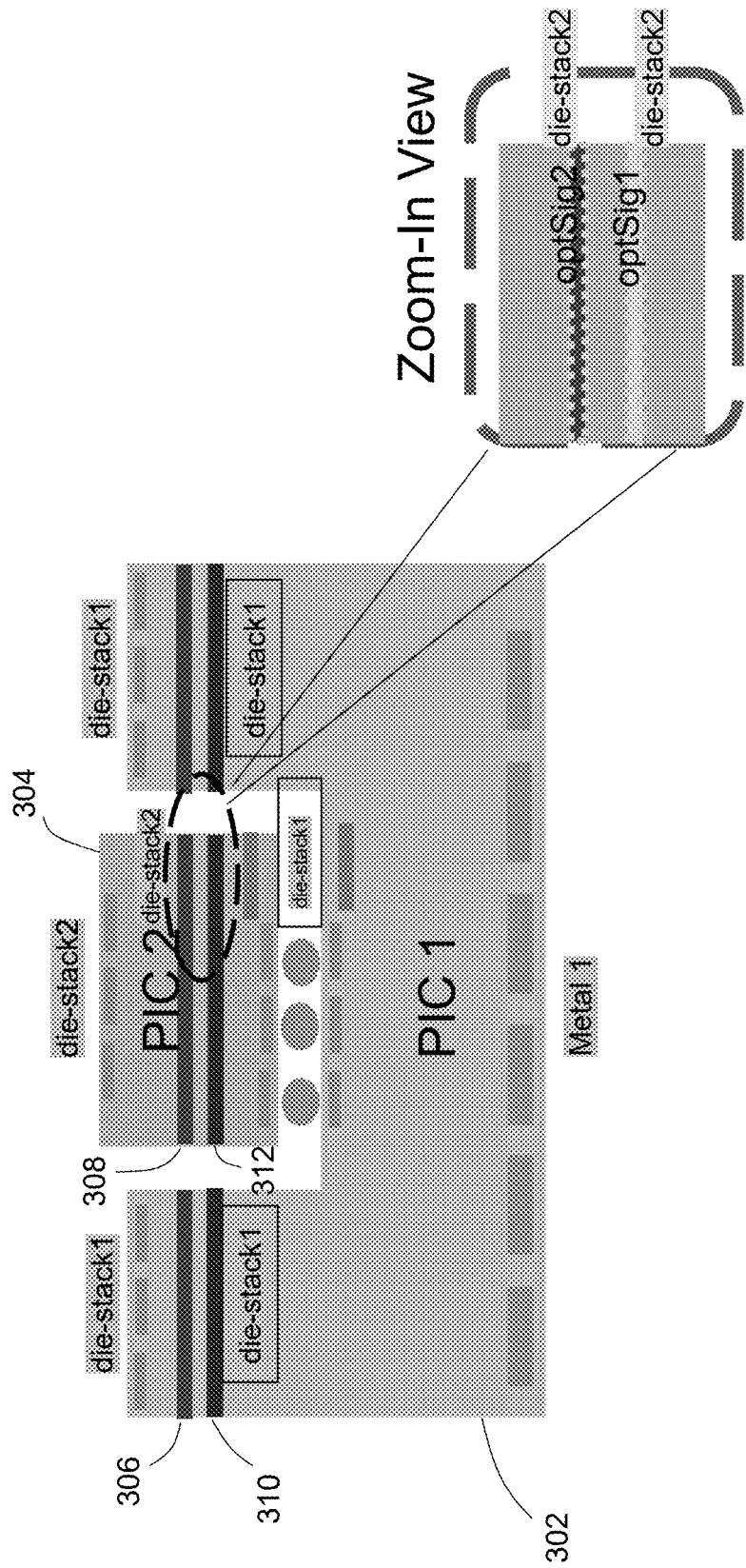

As shown in FIG. 3C, this means that a false positive situation may occur when verifying the package design, since the assumption that these photonic I/Os are on the same die stack layer would lead the EDA tool to believe that a short exists between the photonic I/Os. Here, the figure shows that since photonic I/Os 308 and 312 are both associated with die stack 2, the EDA tool will assume that a short circuit exists between these two I/Os. This is an incorrect assumption since these photonic layers are actually on different physical layers at different heights within the PIC.

In addition, a false negative situation may exist as well in this figure. Here, it can be seen that photonic I/O 306 on PIC 1 is intended to communicate with photonic I/C 308 on PIC 2. However, photonic I/O 306 has been mapped to die stack 1 while photonic I/C 308 has been mapped to die stack 2. This means that an analysis tool would incorrectly assume these two photonic I/Os will not talk to one another (false negative), even though the physical design very clearly would allow optical coupling to occur between these two photonic I/Os.

Figure 4:
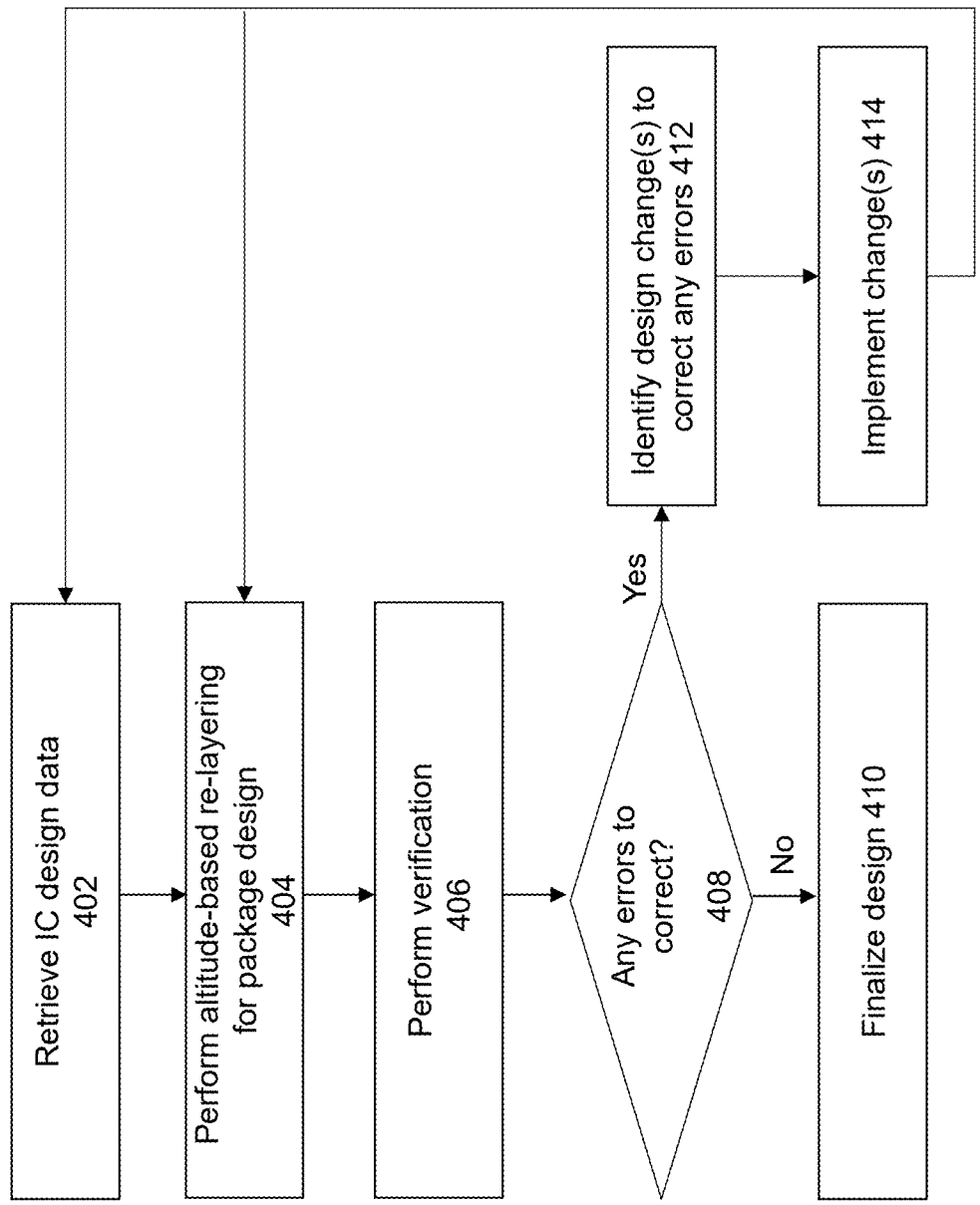
FIG. 4 shows a flowchart of an approach to implement some embodiments of the invention.

Embodiments of the present invention implements altitude-based re-layering for I/Os to address the above-described problems. FIG. 4 shows a flowchart of an approach to implement some embodiments of the invention. At 402, IC design data is retrieved for the ICs/dies that are intended to be placed within the package. Any suitable design data format may be employed within embodiments of the invention. For example, the retrieved data may correspond to a die layout embodied as cellview data, which represents the IC design with respect to the layout, schematic, and symbol data for the IC.

The exported die footprint is the cellview that represents the footprint of the die, which will be instantiated in the package design. At 404, altitude-based re-layering is performed to re-layer for the package design. When the die footprint is instantiated in a package cellview, instead of re-layering I/Os to specific layers based on just the front or back side of the die (e.g., according to the die's tier, mirrored and flipped status), the current embodiment re-layer the I/Os to specific die-stack layers based on their absolute altitudes in die stack. The absolute values of the z-elevation of each I/O from bottom of package can be calculated and those I/Os are re-layered to specific die-stack layer at the calculated z-elevation values. This means that instead of just two die stack layers for a die corresponding to the front and back sides, the current embodiment will cause the die I/Os to be re-layered to "N" die stack layers at any pertinent z elevation height appropriate for, and depending upon, the I/Os at different altitudes in IC-without being restricted to just two die stack layers.

This altitude-based approach resolves the problems associated with any approach that is limited to die stack layers at just the front and back sides of the dies. This is because, unlike the approach that is limited to just two dies stack layers, the altitude-based die stack layers will allow N number of die stack layers corresponding to the actual altitudes of the I/Os in the design. This prevents the mistaken association of I/Os at different elevations to the same die stack layer. In this way, false positives based upon mistaken assignments of I/Os at different elevations to the same die stack layers can be avoided.

At 406, verification is performed upon the package design. For example, after an editing operation is performed on the design, verification may be implemented to check for any design errors such as open circuits and short circuits in the design. What is notable is that with the current altitude-based approach, the EDA system will reduce and/or eliminate false positives based upon the mistaken assignment of I/Os at different elevations to the same die stack layer. For instance, cavitated dies can have multiple die stack layers for I/Os at different facet-based elevation heights in the cavities, and thus will no longer be the subject of a false negative for a wrongly identified short because of a facet-based I/O being associated with a front-side or back-side die stack. Similarly, photonic I/Os can be associated die stack layers at their altitude, rather than having multiple photonic I/OS at different heights being mistakenly lumped together at a common die stack layer, thereby avoiding false positives for any corresponding mistakenly identified short circuits.

At 408 with the false positives (and possibly false negatives) minimized, the true errors can then be identified for correction by the designer. If there are any such errors to correct, then at 412, design changes may be identified for correction. At 414, the design changes are implemented, e.g., at any fabric of the design, such as within the IC design or in the package design. The process may then return back to an earlier stage of the flow (e.g., to steps 402 and/or 404), and some or all of the previous steps can be performed for the revised design. If there are no further errors to correct, then at 410, the package design can be finalized.

FIG. 5 shows a flowchart of an approach to perform altitude-based re-layering according to some embodiments of the invention. At 502, altitude data is retrieved for the die. This may be performed, for example, by performing a die export operation that is used to create a die abstract decorated with properties to specify the altitude of the I/Os in the IC. In EDA systems, a die abstract file is used to convey die information between the IC and package layout tools. In some embodiments, the die abstract may be implemented as an ASCII XML file that contains the IC's I/O pad-ring, RDL, and bump array. The die abstract can be created by the IC design tools, and any refinements made to the die abstract during package design can be communicated back to the IC designer as an updated die abstract.

Figure 6A:
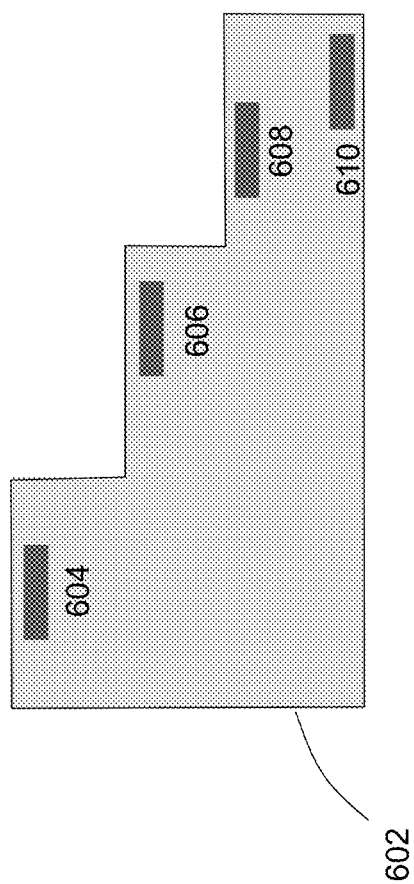
FIGS. 6A-E provide an illustrative example according to some embodiments if the invention.
Figure 6B:
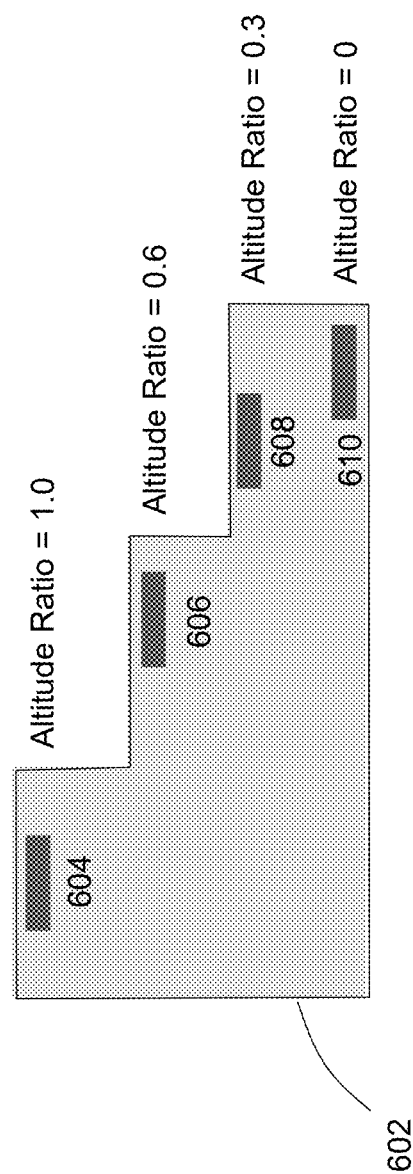

In some embodiments, the altitude information may be presented as an altitude ratio. For example, if a die I/O is in a cavity half the die thickness, then the corresponding I/O in abstract cellview will have an "altitude ratio" property set to value 0.5. FIG. 6A shows an example of a cavitated die 602 having multiple faceted I/Os 604, 606, 608, and 610. As illustrated in FIG. 6B, an altitude value may be obtained for each of the I/Os based upon its I/O height relative to the thickness of the die. For this example, the I/O 604 is associated with an altitude ratio of 1, I/O 606 is associated with an altitude ratio of 0.6, I/O 608 is associated with an altitude ratio of 0.3, and I/O 610 is associated with an altitude ratio of 0.

It is noted that other approaches can also be taken to express the altitude of an I/O. For example, instead of a ratio, an absolute height value may be identified for the I/O, e.g., as measured from the bottom edge of the die.

Figure 6C:
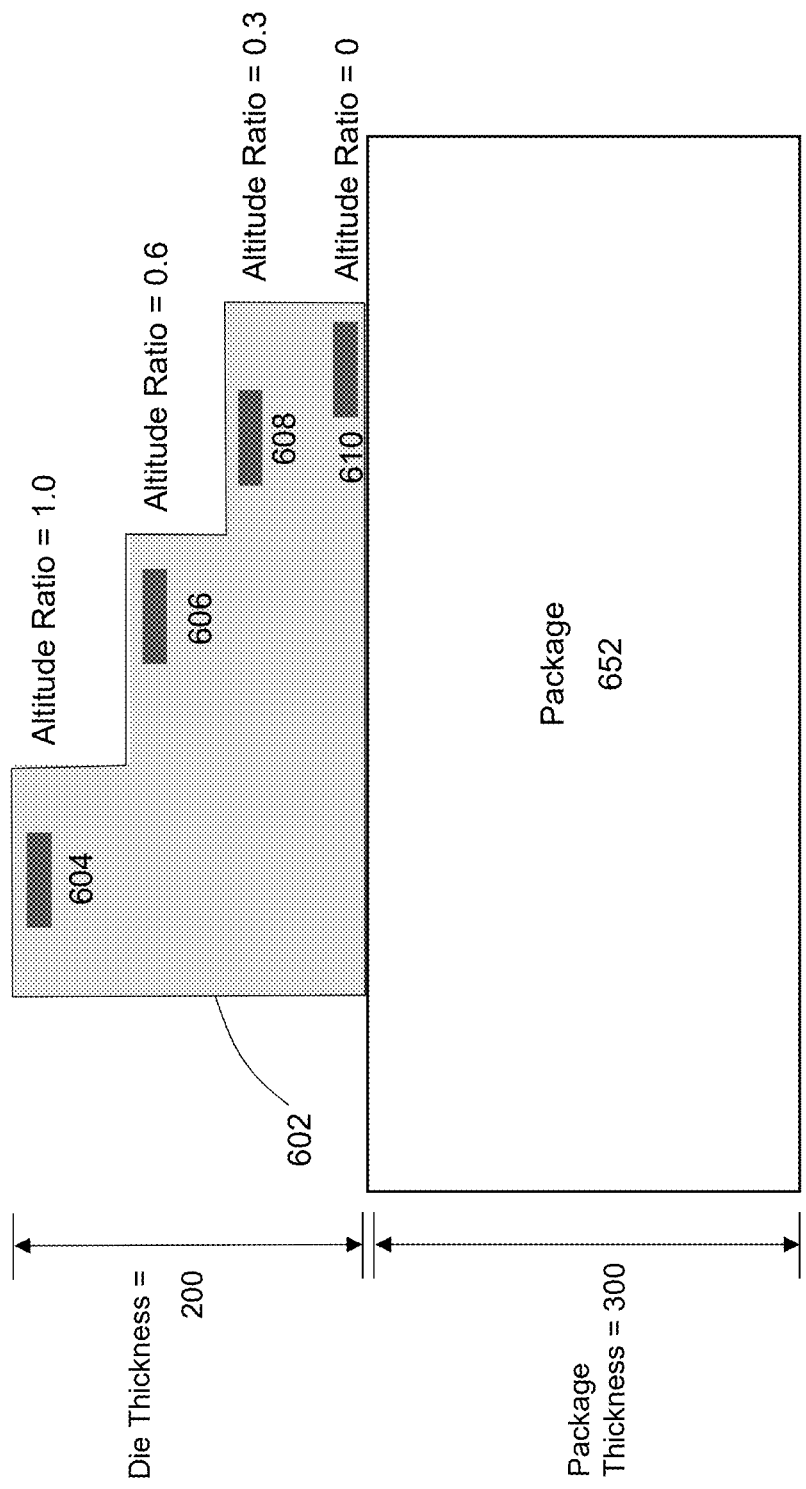

The embodiments of the invention will essentially read the appropriate property from abstract I/Os and re-layer the instance I/Os as per absolute altitude calculation done on the basis of height ratios specified with respect to the I/O's property. Returning back to FIG. 5, the next step at 504 is to identify the respective thickness values for the die and package. For example, in the example of FIG. 6C, the die 602 may be associated with a thickness of 200 and the package 652 may be associated with a thickness of 300.

Figure 6D:
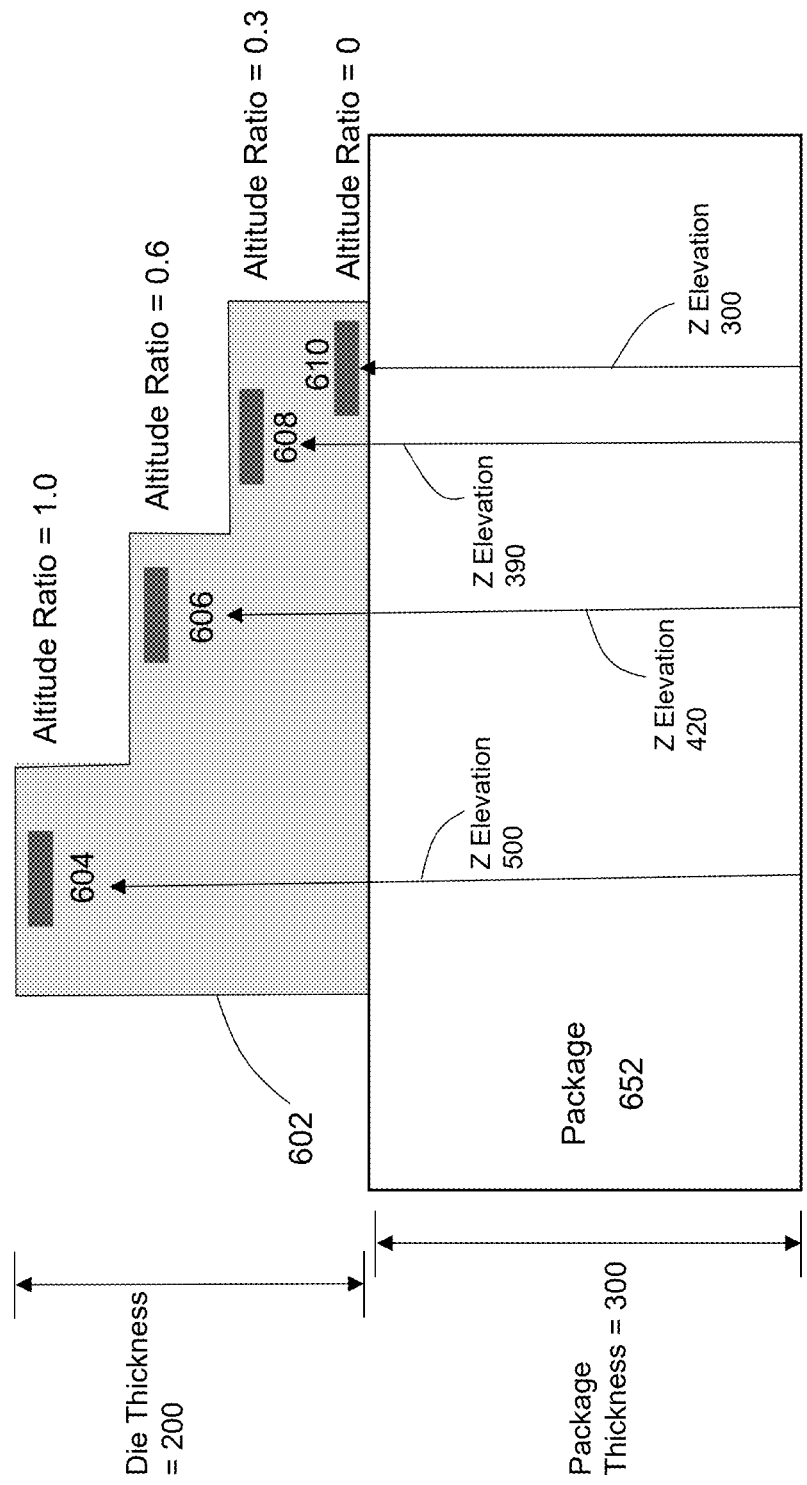

Next, at step 506, absolute elevations may be calculated for each of the I/Os in the IC. One approach to calculate the I/O elevation is to add the package thickness to the product of the altitude ratio and the die thickness (package_thickness+(altitude_rationo_n×die thickness)). As shown in FIG. 6D, this means that I/O 604 with an altitude ratio of 1 is associated with a Z-elevation of 500(300+(200×1)). In addition, I/O 606 with an altitude ratio of 0.6 is associated with a Z-elevation of 420(300+(200×0.6)), I/O 608 with an altitude ratio of 0.3 is associated with a Z-elevation of 390(300+(200×0.3)), and I/O 610 with an altitude ratio of 0.0 is associated with a Z-elevation of 300(300+(200×0.0)).

Figure 6E:
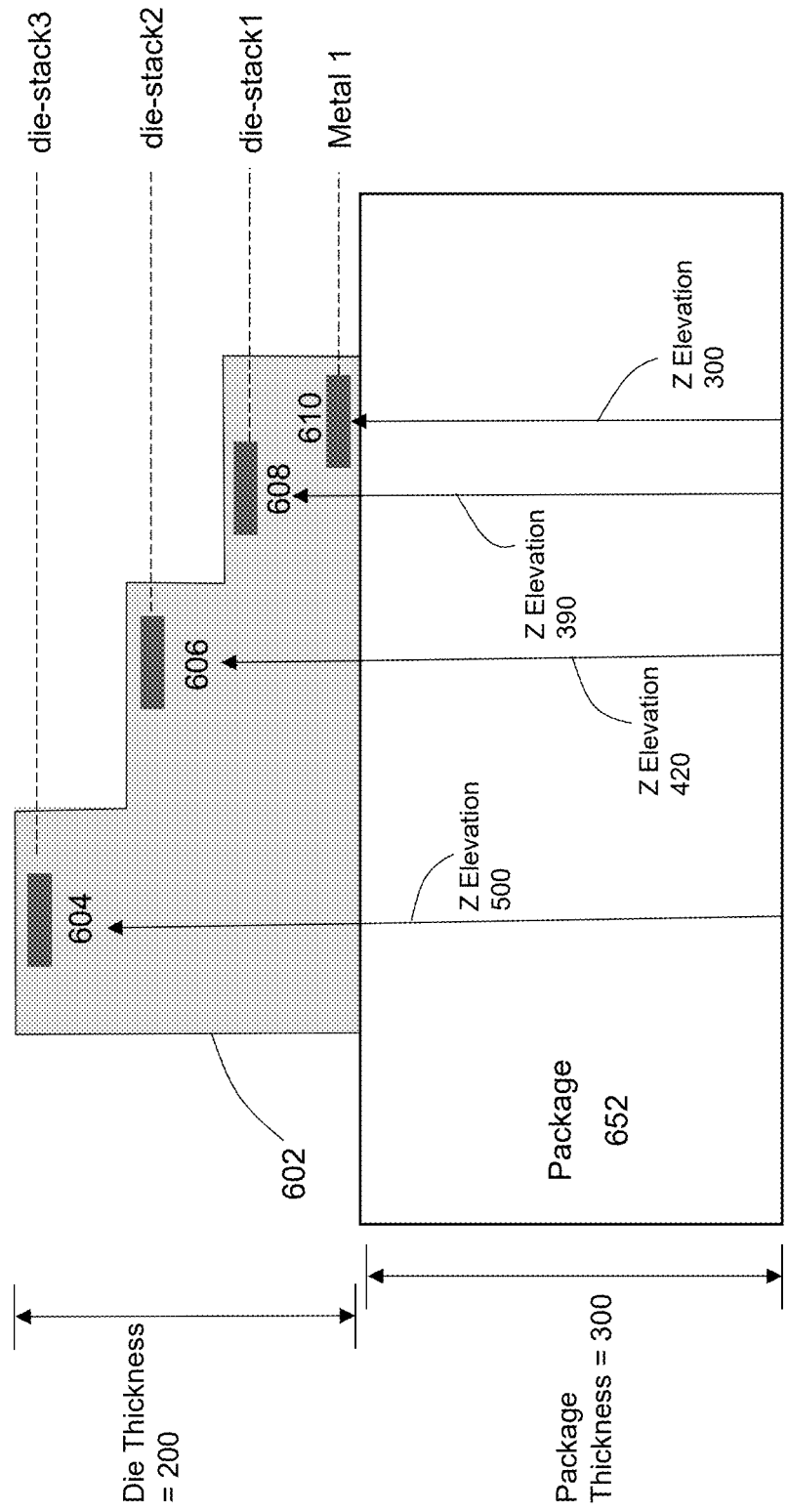

At step 508, a separate die stack layer (or metal layer) is associated with each of the different I/O altitudes. FIG. 6E provides an illustration of the die stack layers that are mapped to each of the I/Os altitudes in die 602, where I/O 604 is associated with die stack 3, I/O 606 is associated with die stack 2, I/O 606 is associated with die stack 1, and I/O 610 is associated with metal 1.

In some embodiments, on instantiation if die-stack layers exists then the I/Os are re-layered to those layers. If not, then new die-stack layers are added in the package technology (with user permissions).

Some embodiments of the invention may be used in conjunction with Technology Independent Layout PCells (TILP). Technology files are employed in many standard electronic design processes, to conform the designs to acceptable technology used by fabrication facilities to ensure that the designs will be manufacturable. Therefore, TILP may be usable to help to instantiate a generic footprint into any package by adopting a package layer and technology. With certain embodiments of the invention, the TILP parameter "IO Layers" may be used to achieve I/O re-layering, where this parameter can be used to provide a specific list of package layers for I/O re-layering. For example, this parameter may have a parameter element for "Name", which corresponds to the I/O layers. A parameter element for "type" may be associated with a list. A parameter element for "default value" may correspond to a list of layers calculated on absolute altitude, as described above. The parameter list can be an ordered list of package layers, where first layer corresponds to I/Os at first altitude and so on, e.g. "list (dieStack3 dieStack4 dieStack5 dieStack6)".

Figure 7A:
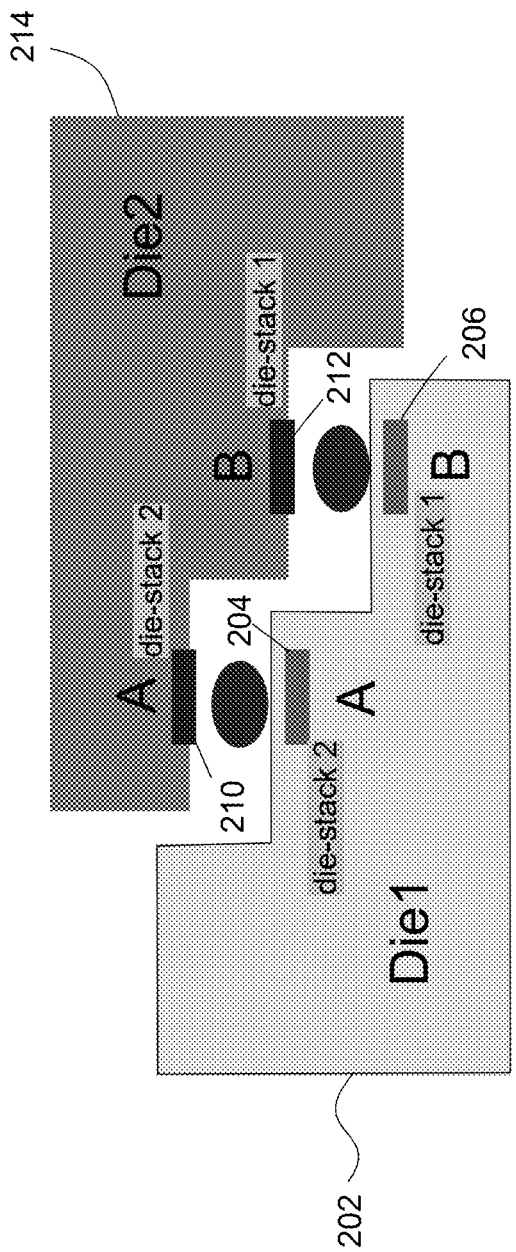
FIGS. 7A-C provide an illustrative example according to some embodiments if the invention.
Figure 7B:
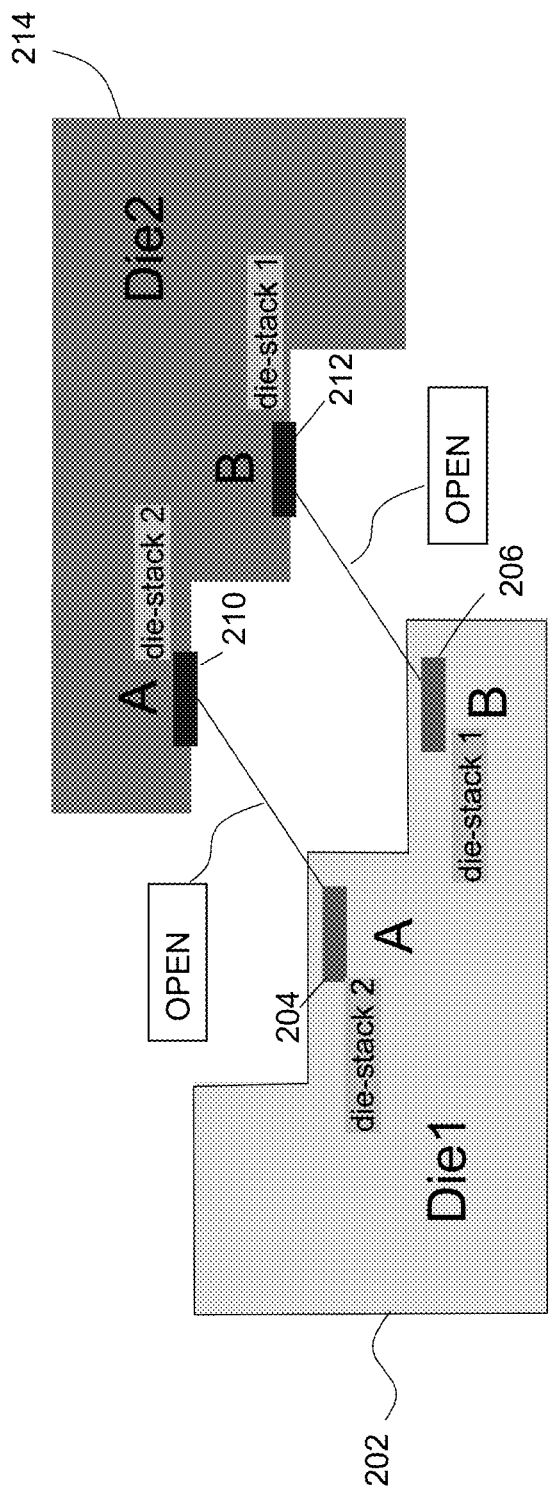
Figure 7C:
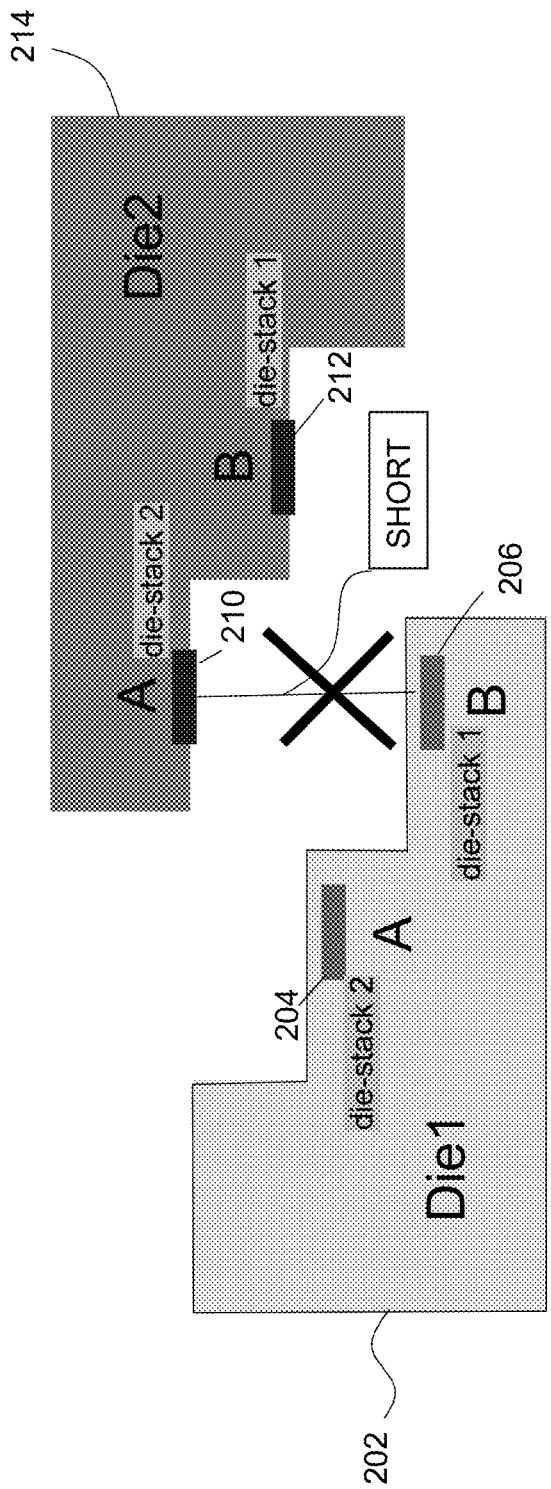

FIGS. 7A-C provides an illustration of how embodiments of the invention can resolve the problems that were previously identified relative to FIGS. 2A-C. FIG. 7A provides an illustration of cavitated dies 202 and 204, where die 202 includes a first I/O 204 and a second I/O 206 on facets at different heights within its cavities. These I/Os interact, respectively, with I/Os 210 and 212 at different facets on die 214.

With the I/O re-layering approach of FIGS. 2A-C, even though the I/O on a facet of a cavity in a die is at a different height on the die, they will nonetheless be re-layered to the same die stack layer in the package. Therefore, in FIGS. 2A-C, this meant that I/Os 204, 206, 210 and 212 were all associated with the same die stack layer (dieStack1). As discussed above with respect to FIG. 2C, after editing the design data, this created a false positive situation, since a short circuit was identified for I/O 206 and I/O 210, even though these I/Os are at different layers at different altitudes.

However, as shown in FIG. 7A, embodiments of the invention will associate the I/Os at different altitudes with different die stack layers. Here, I/O 204 on die 202 is at the same altitude as I/O 210 on die 214. Therefore, these two I/Os are mapped to the same die stack layer (die stack 2). In addition, I/O 206 on die 202 is at the same altitude as I/O 212 on die 214—which are at a different altitude from I/Os 204 and 210. Therefore, I/Os 206 and 212 are mapped to the same die stack layer (die stack 1), which is different from the die stack layer for I/Os 204 and 210.

As shown in FIG. 7C, this altitude-based re-layering has now resolved the problems associated with FIG. 2C. Even though the editing operation has caused I/O 210 on die 214 to now overlap in its geometric (X, Y coordinate) locations with respect to I/O 206 on die 202, this will no longer result in a false positive indication of a short between these two I/Os. This is because the I/O 206 on die 202 is associated with die stack 1 (at a first Z coordinate), whereas I/O 210 on die 214 is associated with die stack 2 (at a second and different Z coordinate).

As shown in FIG. 7B, the invention does not change the previous result of being able to correctly identify the fact that the editing operation has created an "open" for the intended connection between I/O 204 on die 202 and I/O 210 on die 214, and that a similar open has occurred for the intended connection between I/O 206 on die 202 and I/O 212 on die 214.

Figure 8:
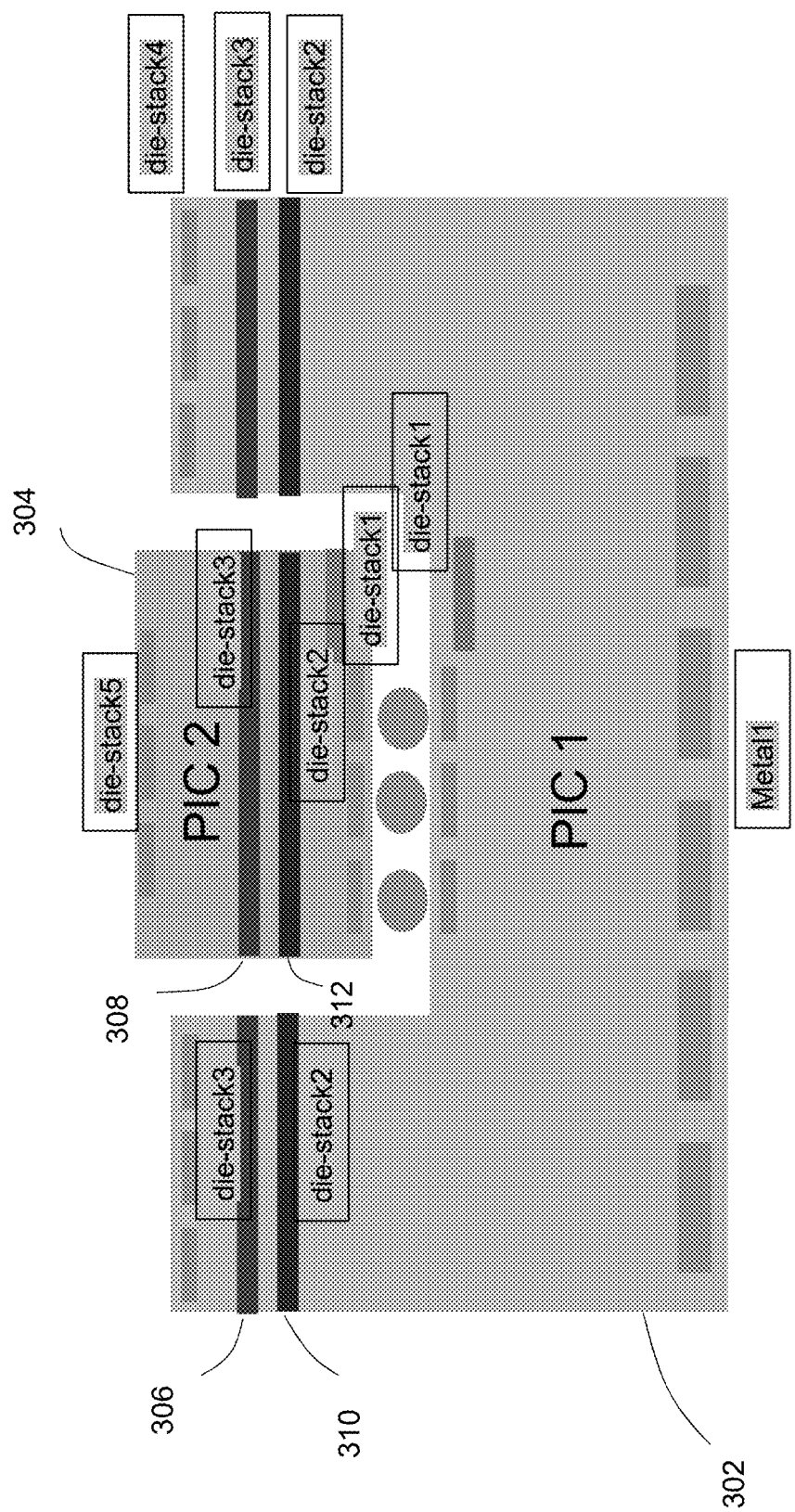
FIG. 8 provides an illustrative example according to some embodiments if the invention.

FIG. 8. provides an illustration of how embodiments of the invention can resolve the problems that were previously identified relative to FIGS. 3A-C. Recall that FIGS. 3A-C show PIC 302 and PIC 304, where PIC 304 is stacked within a cavity of PIC 302 and each of the PICS have photonic lateral I/Os through the sides of the PICs. For example, I/O 306 in PIC 302 is optically coupled to I/O 308 in PIC 304. Similarly, I/O 310 in PIC 302 is optically coupled to I/O 312 in PIC 304. The issue was that conventional re-layering technologies caused photonic I/Os 306 and 310 to be mapped to the same die stack layer (die stack 1), even though they are actually located on different layers within PIC 302. Similarly, photonic I/Os 308 and 312 were mapped to the same die stack layer (die stack 2), even though they are actually located on different layers within PIC 304. As was shown in FIG. 3C, this meant that a false positive situation may occur when verifying the package design, since the assumption that these photonic I/Os are on the same die stack layer would lead the EDA tool to believe that a shot exists between the photonic I/Os.

In the example of FIG. 8, the problems of FIGS. 3A-C have been resolved since the photonic I/Os at different altitudes are now associated with different die stack layers. Here, photonic I/O 310 in PIC 302 and I/O 312 in PIC 304 are now both associated with the same die stack 2, since these I/Os are at the same altitude. In contrast, photonic I/O 306 in PIC 302 and I/O 308 in PIC 304 are now both associated with die stack 1, since these I/Os are at the same altitude. Since I/O 310 is associated with a different die stack layer as compared to I/O 306, this means that the EDA tool will no longer identify a "false negative" short between these two I/Os. Similarly, since I/O 312 is now also associated with a different die stack layer as compared to I/O 308, this means that the EDA tool will not identify a short between these two I/Os.

Figure 9:
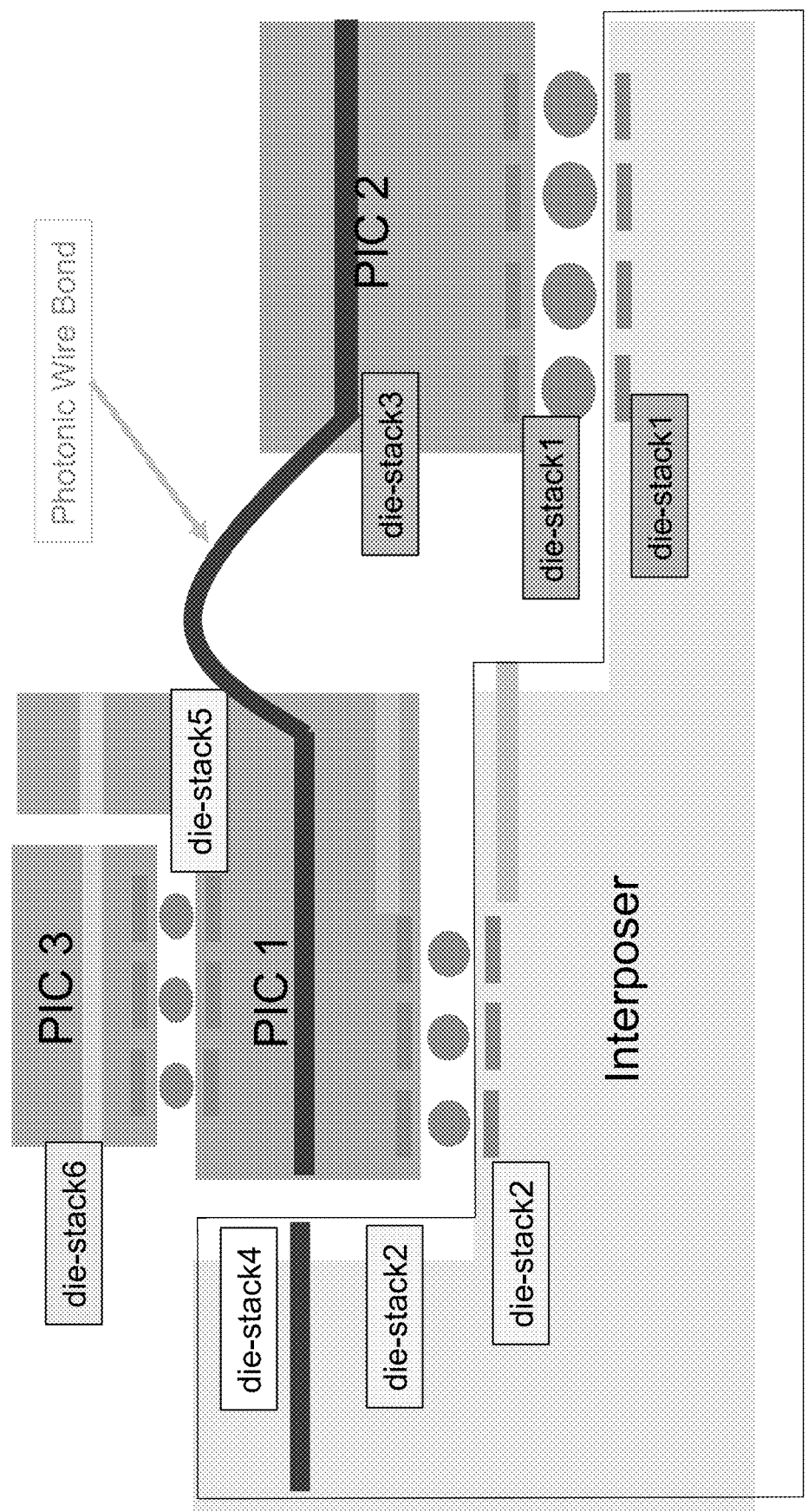
FIG. 9 provides an illustrative example according to some embodiments if the invention.

The inventive concepts described herein can be applied to numerous other design situations as well. For example, FIG. 9 shows that altitude-based re-layering may be usefully applied to stacked photonic ICs. In this example, PIC 3 is stacked on PIC 1, which is stacked on an interposer. PIC2 is also stacked on the interposer. It can be seen that the various I/Os in this configuration for the different PICs are at numerous different altitudes. Regardless of the complexity of the numerous different I/O locations, since the die stack layers are assigned based upon the different altitudes, this means that each die stack layer is appropriately assigned without overlaps at each respective I/O altitude within the design.

Figure 10:
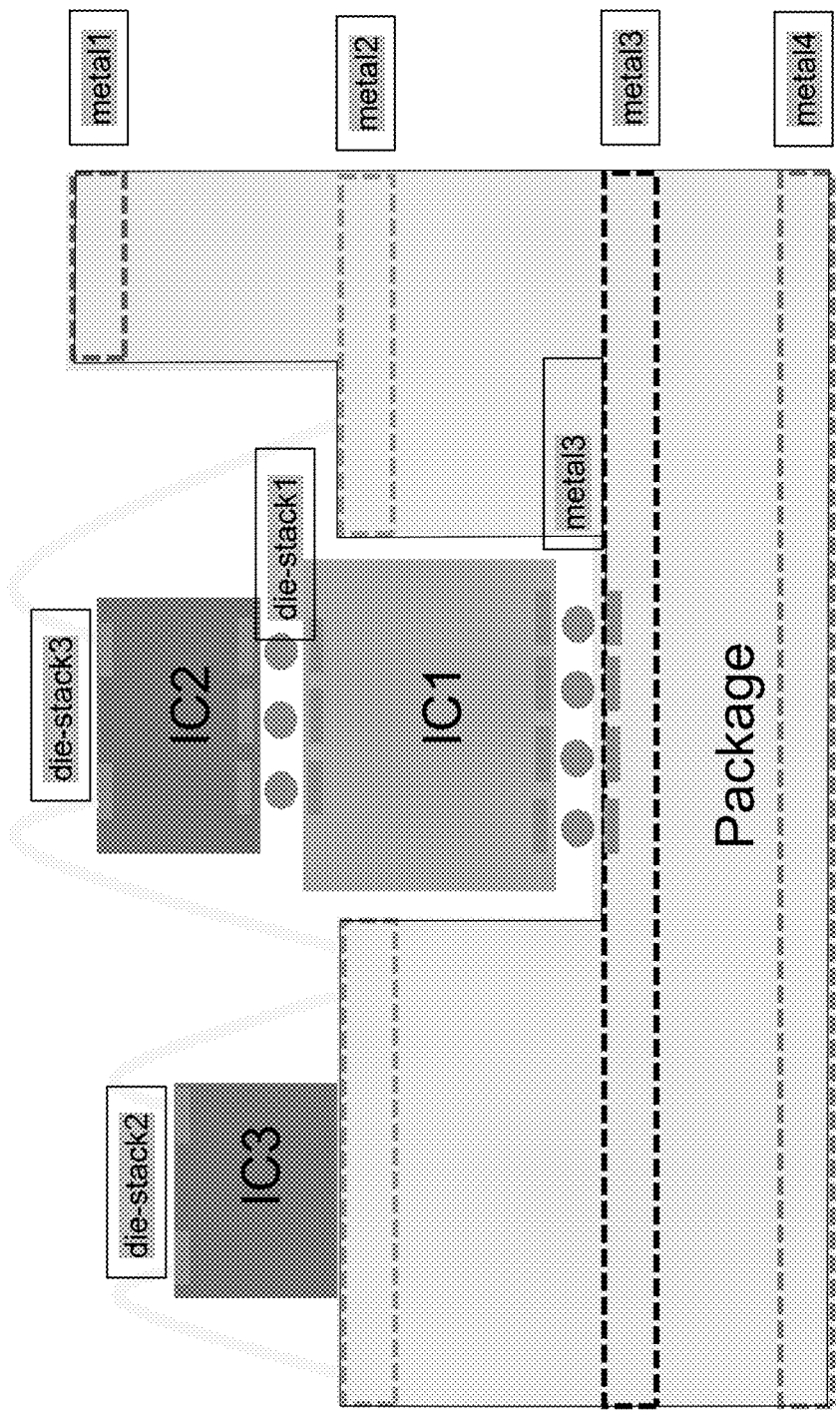
FIG. 10 provides an illustrative example according to some embodiments if the invention.

FIG. 10 shows yet another example of altitude-based re-layering applied to an additional package cavity situation. In this example, IC1 is located within a cavity in the package, with IC2 stacked on IC1. IC3 is also stacked on the package. There are I/Os in this example at numerous different altitudes in the design. Despite the complexity of the multiple I/O on different ICs at different locations/altitudes, the inventive concept permits an altitude-based approach to assign the I/Os to the appropriate package layer. Here, because of the cavity in the package, this means that multiple metal layers may be identified in the design corresponding to the different Z-values for the different absolute altitudes identified for the metals layers in the package.

Figure 11:
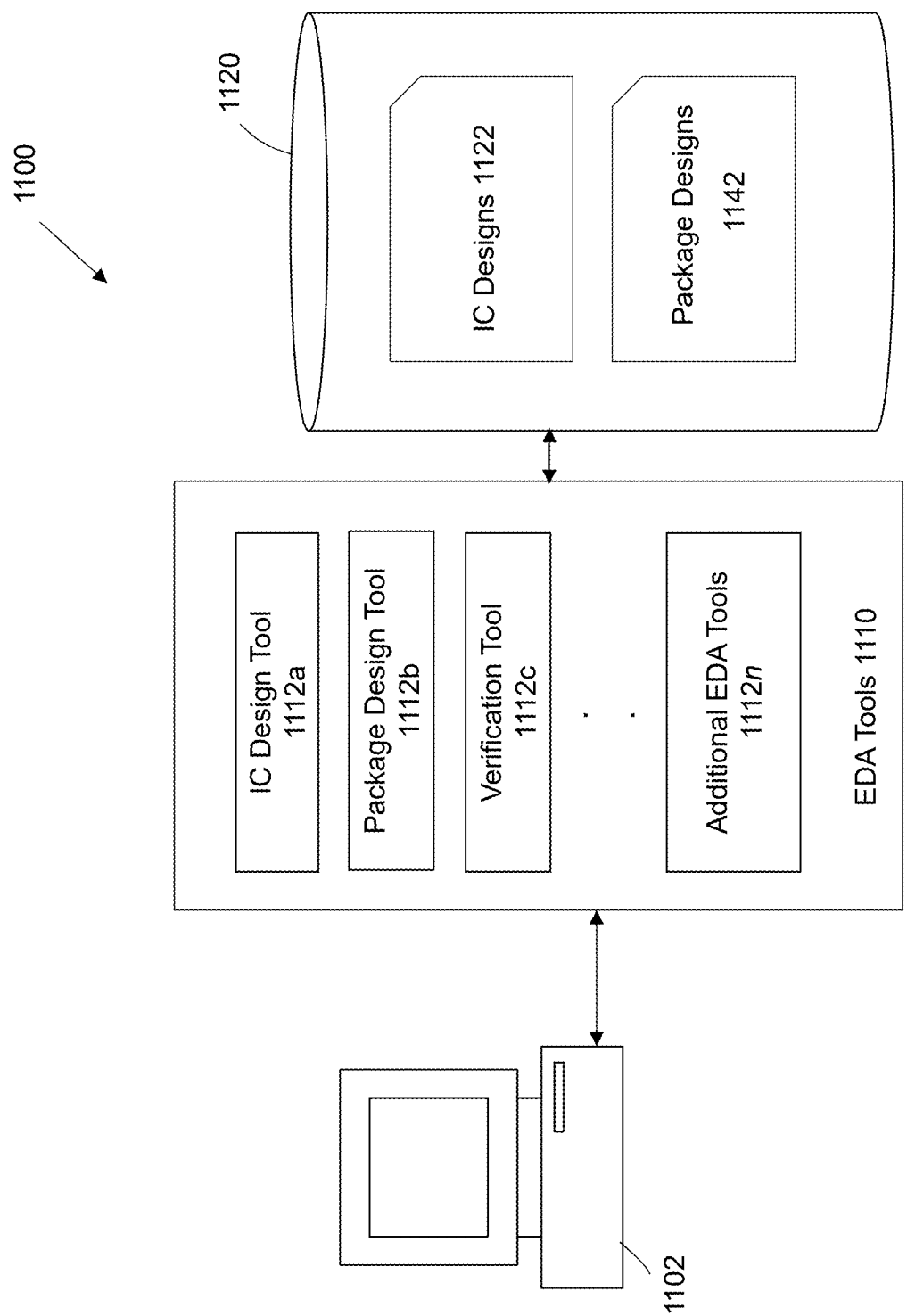
FIG. 11 illustrates an example system which may be employed in some embodiments of the invention to implement/an electronic design.

FIG. 11 illustrates an example system 1100 which may be employed in some embodiments of the invention to implement/edit an electronic design. System 1100 includes one or more users at one or more user stations 1102 that operate the system 1100 to design or edit electronic designs. Such users include, for example, design engineers or verification engineers. User station 1102 comprises any type of computing station that may be used to operate, interface with, or implement EDA applications/tools 1110 that operate on a user station, server, or as a cloud application. Examples of such user stations 1102 include for example, workstations, personal computers, or remote computing terminals. User station 1102 comprises a display device, such as a display monitor, for displaying electronic design schematics, layouts, and processing results to users at the user station 1102. User station 1102 also comprises one or more input devices for the user to provide operational control over the activities of system 1100, such as a mouse or keyboard to manipulate a pointing object in a graphical user interface to generate user inputs.

The electronic design data may be stored in a computer readable storage device 1120. Computer readable storage device 1120 comprises any combination of hardware and software that allows for ready access to the data that is located at the computer readable storage device 1120. For example, computer readable storage device 1120 could be implemented as computer memory operatively managed by an operating system. The computer readable storage device 1120 could also be implemented as an electronic database system having storage on persistent and/or non-persistent storage. The computer readable storage device 1120 could also be implemented as storage located within a cloud-based storage system. The design data stored within storage device 1120 may be organized using any suitable approach. For example, the OpenAccess, available from the OpenAccess Coalition, may be used as the standard for database access and storage technology for organization of the design data used within system 1100.

One or more computer aided design (CAD) tools or EDA tools 1110 may be implemented and used by users at a user station 1102 to create or edit an electronic design. In embodiments of the invention, the EDA tools 1110 include an IC design tool 1112*a*, a package design tool 1112*b*, and/or an analysis tool 1112*c*. Other and additional tools 1112*n* may also be provided within system 500, including for example, additional electronic design simulation and verification tools.

To design an integrated circuit, a designer first creates high level behavior descriptions of the IC device using a high-level hardware design language. The EDA tools 1110 may be used to receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example. An integrated circuit designer may use a set of layout EDA application programs to create a physical integrated circuit design layout from a logical circuit design. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. The physical layout is typically described as many patterned layers, and the pattern of each layer is described by the union of a set of polygons. Component devices and interconnections of the integrated circuit are constructed layer by layer. A layer is deposited on the wafer and then it is patterned using a photolithography process and an etch process. One or more photomasks may then be created from the layout file for the photolithography of each layer. Photomasks are used to transfer the layout pattern onto the physical layer on the wafer. A photomask, or mask, provides an image of the desired physical geometries of the respective integrated circuit layer. Passing light through the mask projects the layout pattern for the layer onto the wafer. An imaging lens system projects and focuses the layout onto the substrate. The projected light pattern interacts with a photosensitive resist coating on the wafer and, resist portions that are exposed to light are rendered either soluble or insoluble in a developer solution, depending on the type of the photoresist. Accordingly, the mask pattern is transferred into the photo-resist by optical projection and chemical reactions. The photo-resist pattern is subsequently transferred to an underlying layer by an etch process. Most commonly, plasma containing chemically-selective reactive ions is used to etch high-aspect ratio trenches and holes with close to vertical sidewalls. In conjunction to the IC design process, a package deigns process may be used to create a package design 1142. The package design process may be implemented by operating the package design tool 1112*b* to access the IC design data 1122.

Therefore, what has been described is an improved approach to implement electronic designs by performing altitude-based re-layering for I/Os. The altitude-based approach resolves the problems associated with approaches that are limited to die stack layers at just the front and back sides of the dies. Unlike the approach that is limited to just two dies stack layers, the altitude-based die stack layers will allow N number of die stack layers corresponding to the actual altitudes of the I/Os in the design. This prevents the mistaken association of I/Os at different elevations to the same die stack layer.

Embodiments of the invention can be implemented to choose unique package layers for assigning cavitated die IOs or photonic IOs at different layers. This approach thereby makes sure that IOs are correctly represented in die footprint instance and false shorts or connectivity issues are not reported. Some embodiments permit stacking of photonic ICs and cavitated dice on an interposer, by correctly re-layering IOs at different altitudes to different package layers, hence maintaining inter die and top level connectivity. Additional embodiments pertain to stacked dice of variable thickness sitting inside package cavity, wire bonded or bump connected, where the embodiment is able to re-layer IOs correctly to die-stack layers based on absolute altitude values. Some embodiments pertain to user flexibility to provide specific package layers for IO re-layering using an "I/O Layer" parameter.

System Architecture Over View

Figure 12:
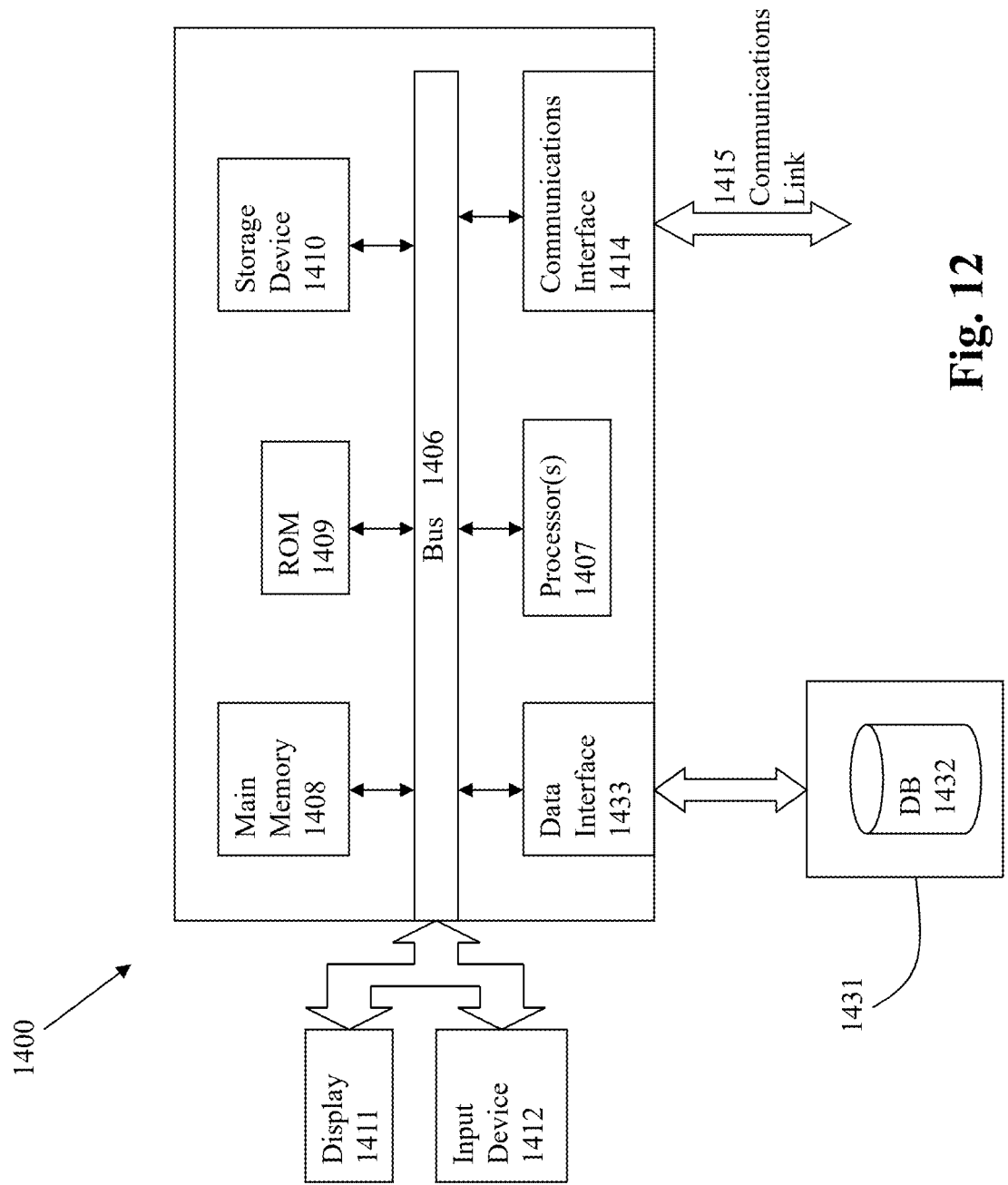
FIG. 12 shows an architecture of an example computing system with which the invention may be implemented.

FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another. Data may be accessed on a database 1432 on a storage device 1432 through a data interface 1433.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method implemented with a processor, the method comprising:
 retrieving IC design data;
 performing altitude-based re-layering of the IC design data for a package design, wherein a die includes an I/O that is mapped to a die stack layer between a front side of the die and a back side of the die;
 performing verification on the package design; and
 determining, based upon results of performing the verification, whether a design error exists that should be corrected.

2. The method of claim 1, wherein the altitude-based re-layering comprises:
 retrieving altitude data for the die;
 identifying thickness data for the die;
 identifying package thickness for a package; and
 calculating a die stack altitude based at least in part upon the altitude data, the thickness data, and the package thickness.

3. The method of claim 2, wherein a die abstract file is accessed which includes one or more of the altitude data or the thickness data for the die.

4. The method of claim 2, wherein the altitude data comprises at least one of an altitude ratio or an absolute altitude value.

5. The method of claim 2, wherein the altitude-based re-layering relative to a given I/O is used to obtain an absolute altitude value for the given I/O, which is assigned to a respective die stack layer.

6. The method of claim 2, wherein the die stack altitude is calculated according to (package_thickness+(altitude_rationo_n×die thickness)).

7. The method of claim 1, wherein separate die stack layers are associated with different I/O altitudes.

8. The method of claim 1, wherein the die comprises one or more cavitated die I/Os or photonic I/Os and at least one of the one or more cavitated die I/Os or photonic I/Os are assigned to the die stack layer between the front side of the die and the back side of the die.

9. The method of claim 1, wherein the IC design data for the package design comprises photonics ICs or cavitated dice that are to be stacked on an interposer, and I/Os of the photonics ICs or cavitated dice are re-layered at different altitudes to different die stack layers.

10. A computer program product embodied on a computer readable medium having stored thereon a sequence of instructions which, when executed by a processor cause a set of acts comprising:
 retrieving IC design data;
 performing altitude-based re-layering of the IC design data for a package design, wherein a die includes an I/O that is mapped to a die stack layer between a front side of the die and a back side of the die;
 performing verification on the package design; and
 determining, based upon results of performing the verification, whether a design error exists that should be corrected.

11. The computer program product of claim 10, wherein the altitude-based re-layering comprises:
 retrieving altitude data for the die;
 identifying thickness data for the die;
 identifying package thickness for a package; and
 calculating a die stack altitude based at least in part upon the altitude data, the thickness data, and the package thickness.

12. The computer program product of claim 11, wherein the altitude-based re-layering relative to a given I/O is used to obtain an absolute altitude value for the given I/O, which is assigned to a respective die stack layer.

13. The computer program product of claim 11, wherein the die stack altitude is calculated according to (package_thickness+(altitude_rationo_n×die thickness)).

14. The computer program product of claim 10, wherein separate die stack layers are associated with different I/O altitudes.

15. The computer program product of claim 10, wherein the die comprises one or more cavitated die I/Os or photonic I/Os and at least one of the one or more cavitated die I/Os or photonic I/Os are assigned to the die stack layer between the front side of the die and the back side of the die.

16. The computer program product of claim 10, wherein the IC design data for the package design comprises photonics ICs or cavitated dice that are to be stacked on an interposer, and I/Os of the photonics ICs or cavitated dice are re-layered at different altitudes to different die stack layers.

17. A system, comprising:
 a processor;
 a memory for holding a sequence of instructions; and wherein the sequence of instructions includes instructions for retrieving IC design data; performing altitude-based re-layering of the IC design data for a package design, wherein a die includes an I/O that is mapped to a die stack layer between a front side of the die and a back side of the die; performing verification on the package design; and determining, based upon results of performing the verification, whether a design error exists that should be corrected.

18. The system of claim 17, wherein the altitude-based re-layering comprises:

retrieving altitude data for a die;

identifying thickness data for the die;

identifying package thickness for a package; and calculating a die stack altitude based at least in part upon the altitude data, the thickness data, and the package thickness.

19. The system of claim 18, wherein the altitude-based re-layering relative to a given I/O is used to obtain an absolute altitude value for the given I/O, which is assigned to a respective die stack layer.

20. The system of claim 17, wherein separate die stack layers are associated with different I/O altitudes.

* * * * *